United States Patent [19]

Bailey et al.

[11] Patent Number: 4,461,539
[45] Date of Patent: Jul. 24, 1984

[54] FIBER OPTIC CONNECTOR ASSEMBLY WITH SLIDABLE SPACER

[75] Inventors: James R. Bailey, Chicago; Eric L. Long, Northbrook, both of Ill.

[73] Assignee: Switchcraft, Inc., Chicago, Ill.

[21] Appl. No.: 268,928

[22] Filed: Jun. 1, 1981

[51] Int. Cl.³ .................................................. G02B 7/26
[52] U.S. Cl. .................................. 350/96.21; 350/96.20
[58] Field of Search ................ 350/96.20, 96.21, 96.22

[56] References Cited

U.S. PATENT DOCUMENTS

| | | | |
|---|---|---|---|
| 3,910,678 | 10/1975 | McCartney et al. | 350/96.21 |
| 3,947,182 | 3/1976 | McCartney | 350/96.22 |
| 3,963,308 | 6/1976 | Lebduska | 350/96.21 |
| 3,963,323 | 6/1976 | Arnold | 350/96.21 |
| 3,984,174 | 10/1976 | Landgreen | 350/96.22 |
| 3,995,935 | 12/1976 | McCartney | 350/96.15 |
| 4,009,931 | 3/1977 | Malsby et al. | 350/96.21 |
| 4,027,938 | 6/1977 | Lewis | 350/96.22 |
| 4,076,379 | 2/1978 | Chouinard | 350/96.22 |
| 4,087,158 | 5/1978 | Lewis et al. | 350/96.21 |
| 4,105,285 | 8/1978 | Bedgood et al. | 350/96.21 |
| 4,118,105 | 10/1978 | Voigt | 350/96.20 |
| 4,140,365 | 2/1979 | Burger et al. | 350/96.20 |
| 4,158,476 | 6/1979 | McCartney | 350/96.21 |
| 4,162,821 | 7/1979 | Schumacher | 350/96.21 |
| 4,166,668 | 9/1979 | MacLeod | 350/96.20 |
| 4,176,909 | 12/1979 | Prunier | 350/96.20 |
| 4,178,068 | 12/1979 | Hoover | 350/96.21 |
| 4,186,995 | 2/1980 | Schumacher | 350/96.20 |
| 4,201,445 | 5/1980 | Kunze | 350/96.21 |
| 4,208,092 | 6/1980 | Monaghan et al. | 350/96.21 |
| 4,220,398 | 9/1980 | Dalgoutte | 350/96.21 |
| 4,257,674 | 3/1981 | Griffin et al. | 350/96.21 |
| 4,285,572 | 8/1981 | Beaudette et al. | 350/96.20 |

FOREIGN PATENT DOCUMENTS 55-4043  1/1980  Japan ............................... 350/96.21

*Primary Examiner*—John D. Lee
*Attorney, Agent, or Firm*—John T. Meaney; Joseph D. Pannone; Richard M. Sharkansky

[57] ABSTRACT

A fiber optic connector assembly comprising a tubular coupling device having an end portion disposed for encircling an end portion of a fiber optic cable, and a slidable apertured spacer axially disposed within the coupling device. The spacer has a central aperture disposed for alignment with a polished end surface of a filamentary light conductor in the cable, and has an annular surface encircling the aperture for abutting an end surface of an opaque sheath encircling the light conductor.

11 Claims, 19 Drawing Figures

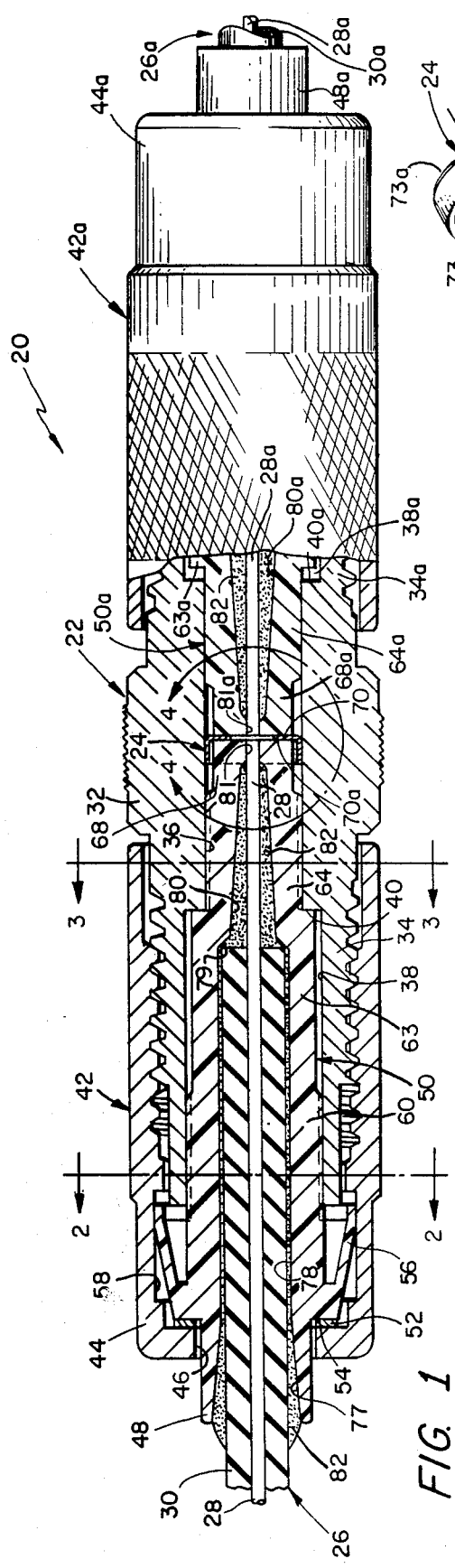
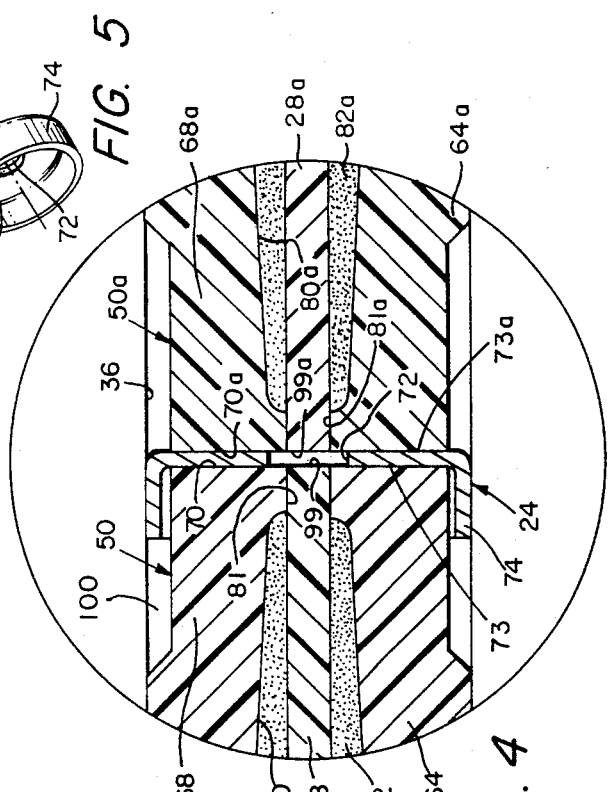
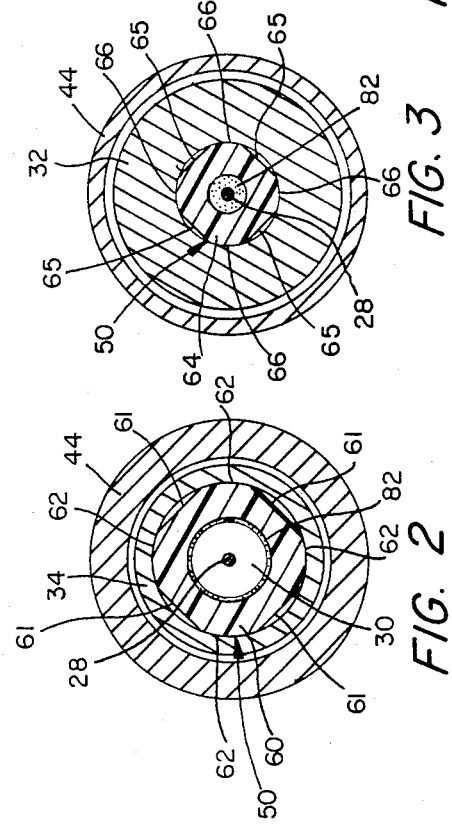

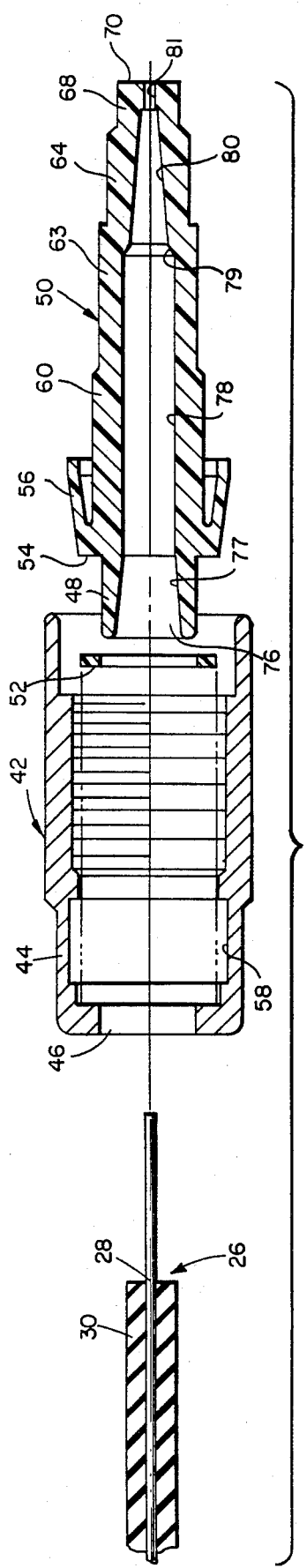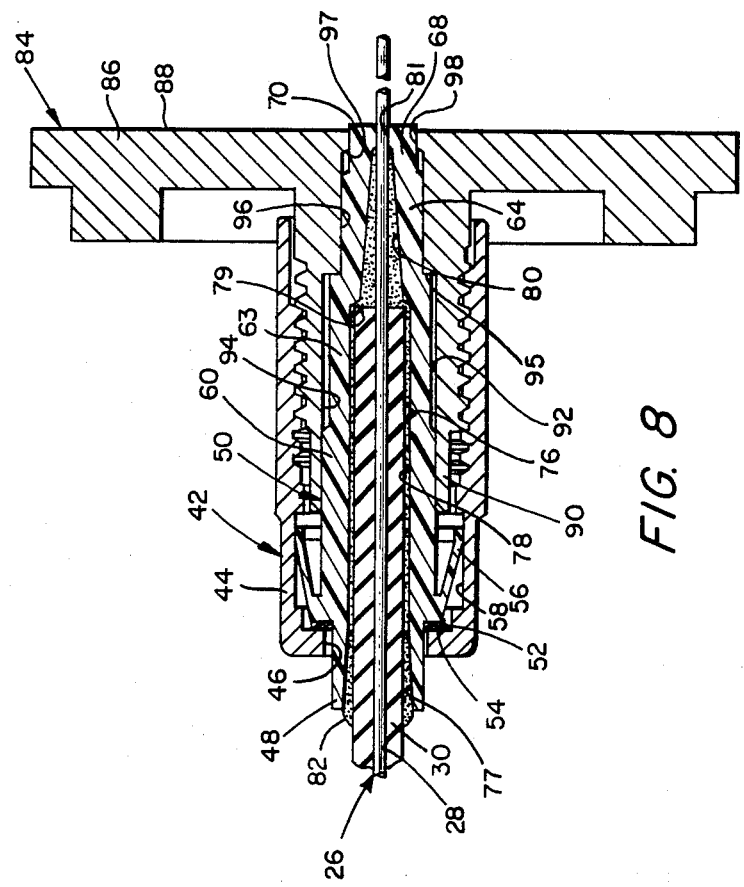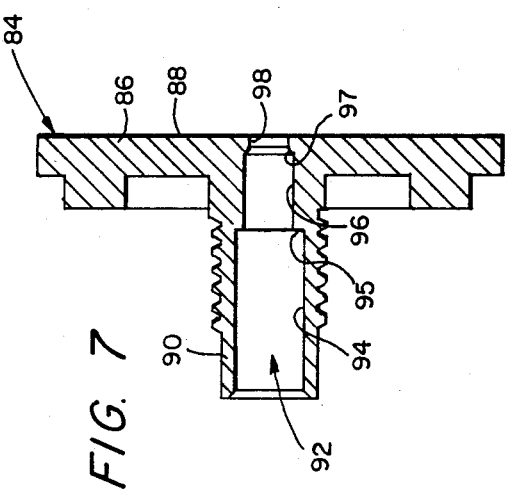

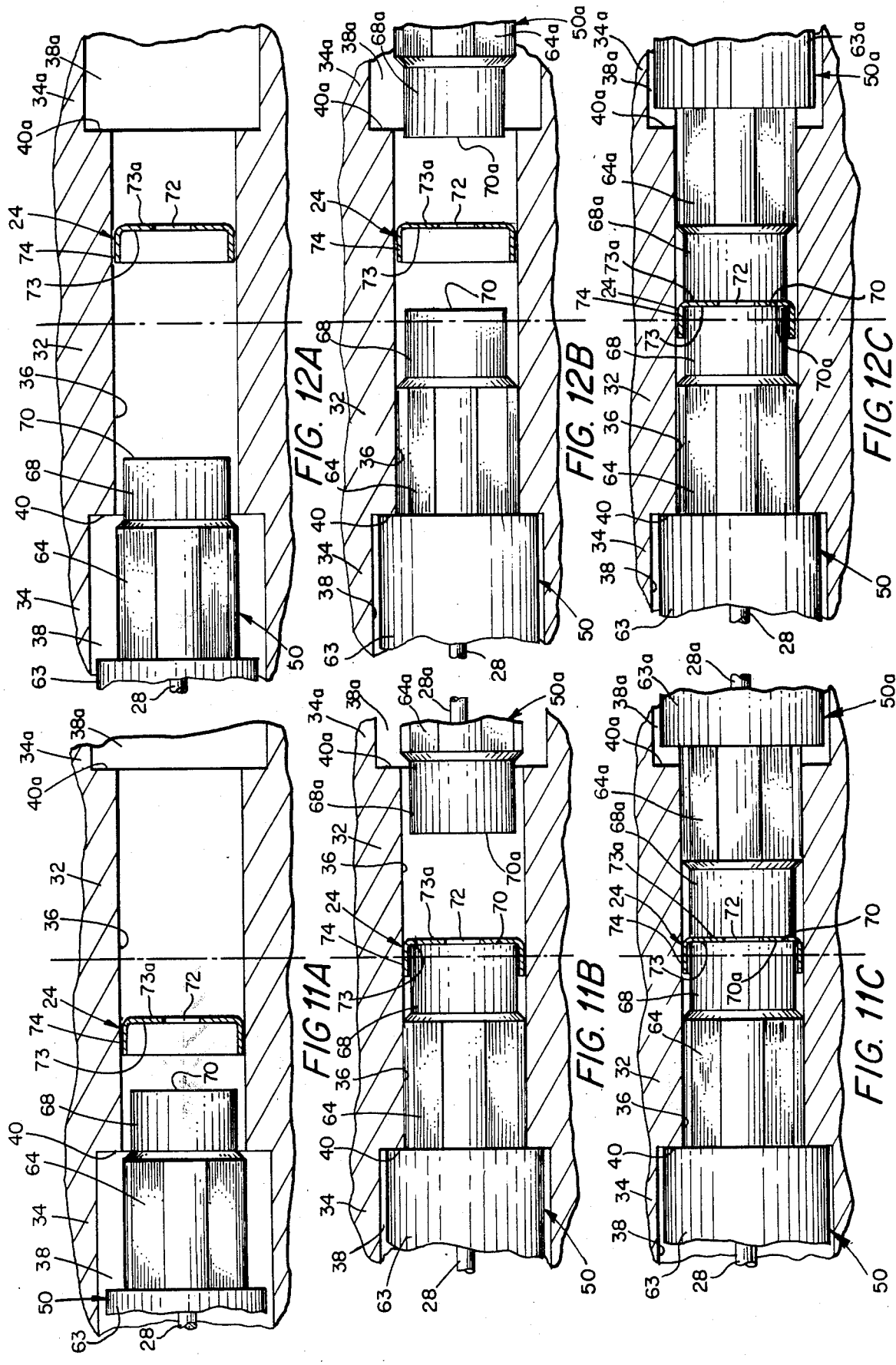

FIBER OPTIC CONNECTOR ASSEMBLY WITH SLIDABLE SPACER

BACKGROUND OF THE INVENTION

1. Field of the Invention

This invention relates generally to connector assemblies and is concerned more particularly with a fiber optic connector assembly for optically coupling to a polished end surface of a fiber optic element.

2. Discussion of the Prior Art

A fiber optic cable generally comprises a fiber optic element including a filamentary light conductor provided with an outer jacket of opaque material, which is similar to the insulation on a filamentary wire in an electrical cable, for example. The fiber optic element usually has opposing end surfaces polished to a suitably smooth finish for promoting efficient transmission of light into and out of the element. Thus, one end surface of the fiber optic element may be disposed to receive signals from a light producing device, such as a light-emitting diode, for example; and the other end surface of the fiber optic element may be disposed to direct the transmitted light signals to a light responsive device, such as a photo-sensitive diode, for example.

Consequently, there has been developed in the prior art fiber connector assemblies for optically coupling the opposing end surfaces of the fiber optic element to light producing and light responsive devices, respectively. Also, since the light responsive device may be located at a considerable distance from the light producing device, there has been developed fiber optic connector assemblies for optically coupling one end surface of a fiber optic element in a cable to an end surface of another fiber optic element in a second cable. However, it has been found that these prior art connector assemblies may not provide the minimum signal loss required in optical coupling while damaging the polished end surfaces of the fiber elements. As a result, the transmission efficiency of light signals through the fiber optic cable is decreased.

SUMMARY OF THE INVENTION

Accordingly, this invention overcomes these and other disadvantages of the prior art by providing a fiber optic connector assembly with means for optically coupling to a polished end surface of a fiber optic element in a fiber optic cable, without damaging the polished end surface and thereby decreasing the transmission efficiency of the cable.

The fiber optic connector assembly of this invention comprises a tubular coupling device having axially disposed therein an apertured cup-shaped spacer which is slidable longitudinally within the device. One end portion of the coupling device is disposed to encircle an end portion of a fiber optic element comprising a filamentary light conductor provided with an outer jacket of opaque material. The central aperture of the spacer cup is disposed for alignment with a polished end surface of the light conductor; and the annular surface of the spacer cup encircling the aperture is disposed for butting engagement with an end surface of the opaque jacket encircling the light conductor. As a result of the butting engagement, the spacer cup slides longitudinally within the coupling device to permit the engaged end portion of the fiber optic element to be inserted fully into the engaged end portion of the coupling device and secured therein by conventional means, such as a threaded shell, for example.

The other end portion of the coupling device is disposed to receive therein a light operative device, such as another fiber optic element, for example, which abuts the opposing annular surface of the spacer cup encircling the central aperture thereof. Thus, the light operative device is optically coupled to the polished end surface of the initially inserted fiber optic element through the central aperture of the spacer cup. Also, the light operative device is suitably spaced from the polished end surface of the initially inserted fiber optic element by the spacer cup being provided with a predetermined thickness. As a result, the light operative device is optically coupled to the polished end surface of the initially inserted fiber optic element in a manner to minimize losses and avoid damaging the polished end surface, which decreases the light transmission efficiency of the connector assembly.

BRIEF DESCRIPTION OF THE DRAWINGS

For a better understanding of this invention, reference is made in the following detailed description to the drawings wherein:

FIG. 1 shows a plan view, partly in axial section, of a fiber optic cable assembly embodying the connector assembly of this invention;

FIG. 2 is a transverse sectional view taken along the line 2—2 in FIG. 1 and looking in the direction of the arrows;

FIG. 3 is a transverse sectional view taken along the line 3—3 in FIG. 1 and looking in the direction of the arrows;

FIG. 4 is an enlarged fragmentary view, in axial section, of the structure encircled by arcuate arrow 4—4 in FIG. 1;

FIG. 5 is an isometric view of the spacer cup shown in FIGS. 1 and 4;

FIG. 6 is an exploded fragmentary view, in axial section, of one of the terminal cable coupling devices shown in FIG. 1;

FIG. 7 is an axial sectional view of a fixture used for polishing end surfaces of fiber optic elements;

FIG. 8 is an axial sectional view of the fixture shown in FIG. 7 having secured thereto the assembled cable connector shown exploded in FIG. 6;

FIGS. 11a–11c are respective diagrammatic views illustrating one operation of the slidable spacer cup during assembly of the fiber optic coupling assembly shown in FIGS. 1 and 10;

FIGS. 12a–12c are respective diagrammatic views illustrating another operation of the slidable spacer cup during assembly of the fiber optic coupling assembly shown in FIGS. 1 and 10;

DESCRIPTION OF THE PREFERRED EMBODIMENT

Figures 9, 10:
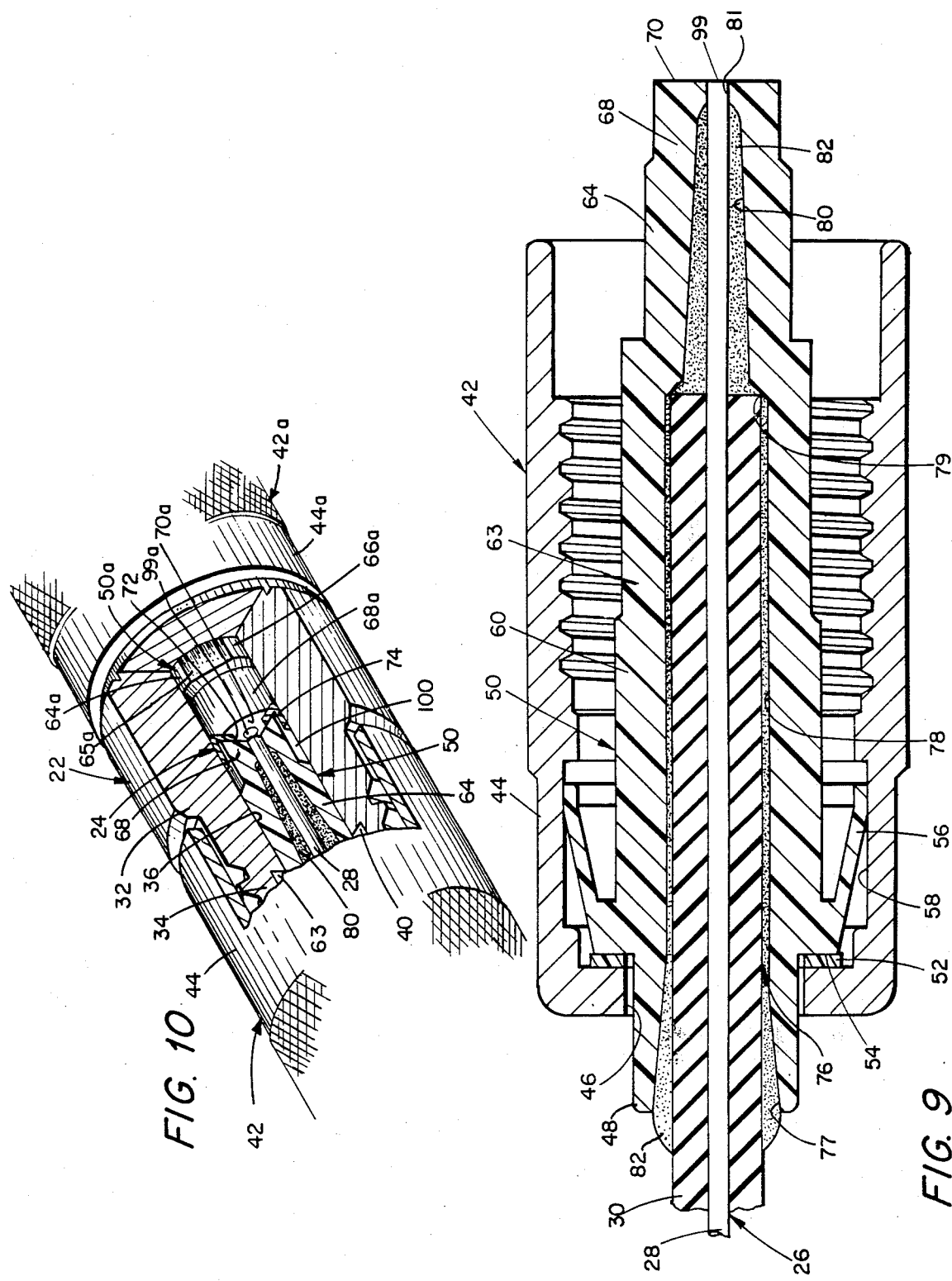
FIG. 9 is an enlarged axial sectional view of the finished cable connector shown unassembled in FIG. 6.
FIG. 10 is an isometric view of the fiber optic coupling assembly shown in axial section in FIG. 1 but having a wall portion of the intercable coupling device broken away to illustrate the function of the spacer washer.

Referring to the drawings wherein like characters of reference designate like parts, FIG. 1 shows a fiber optic cable-to-cable coupling assembly 20 including a tubular coupling device 22 having therein a longitudinally slidable spacer cup 24. Cup 24 is axially disposed within the coupling device 22 for optically coupling an adjacent end portion of a fiber optic cable 26 to an adjacent end portion of another fiber optic cable 26a. The fiber optic cables 26 and 26a include axial filamentary light conductors 28 and 28a, respectively, which are made of flexible light conducting material, such as fiber glass, for example, and coaxial outer jackets 30 and 30a, respectively, which are made of flexible opaque material, such as moldable plastic material, for example. Each of the light conductors 28 and 28a may be of the conventional type having an inner axial core (not shown) of fiber glass material and an outer coaxial sheath (not shown) of another fiber glass material having a lower index of refraction than the fiber glass material of the inner core. Thus, by means of total internal reflection, each of the light conductors 28 and 28a is enabled to transmit light longitudinally from one end surface to its other end surface.

Coupling device 22 comprises a tubular body of rigid material, such as nickel plated brass alloy, for example, having a central portion 32 integrally joined to opposing end portions, 34 and 34a, respectively, of the device 22. A bore 36 extends axially through the central portion 32 and is defined by inner wall surfaces of the central portion which are substantially concentric with the axial centerline of the bore 36. Opposing end portions of the bore 36 communicate with respective aligned cavities 38 and 38a which extend axially through end portions 34 and 34a, respectively, to terminate at respective opposing open ends of the tubular device 22. The cavities 38 and 38a have respective diameters which are similar in magnitude to one another and are relatively larger than the diameter of bore 36 whereby the resulting thicker wall central portion 32 forms respective annular shoulders 40 and 40a at the inner ends of cavities, 38 and 38a respectively. The outer cylindrical surfaces of cavities 38 and 38a are defined by the inner wall surfaces of end portions 34 and 34a, respectively, which are substantially concentric with the respective axial centerlines of the cavities 38 and 38a. The central portion 32 may be externally knurled to enhance frictional engagement during coupling. Also, the respective end portions 34 and 34a of device 22 may be externally threaded for engagement with respective female connectors 42 and 42a attached to the adjacent end portions of fiber optic cables 26 and 26a, respectively.

In the interests of conciseness, only the connector 42 will be described in detail. However, it is to be understood that the respective connectors 42 and 42a are identical to one another in construction and configuration. Consequently, structural components of the connector 42a are identified by reference numerals designating equivalent structural components of the connector 42, but followed by the letter "a".

Connector 42 includes an outer cup-shaped shell 44 having an axially extending wall provided with internal threads for engaging the externally threaded end portion 34 of coupling device 22. The closed end of cup-shaped shell 44 has centrally disposed therein an aperture 46 through which loosely extends a neck-end portion 48 of a ferrule 50 which is made of suitable material, such as rigid plastic material, for example. Within shell 44, the neck-end portion 48 of ferrule 50 is encircled by a slip ring 52 made of suitably smooth material, such as polyester film, for example, and terminates in an outwardly extending, annular shoulder 54 of the ferrule. Flaring outwardly from the shoulder 54 is an annular skirt 56 having an opposing end portion of larger diameter which extends radially into an annular channel 58 disposed in the inner surface of shell 44 between the closed end thereof and its internally threaded portion.

The outwardly flaring skirt 56 encircles an axially extending portion 60 of ferrule 50 which, as shown in FIG. 2, is comprised of alternate flatted and rounded surface portions, 61 and 62, respectively which extend longitudinally of ferrule 50. Rounded surface portions 62 are substantially concentric with the axial centerline of ferrule 50 and are press-fitted into the open-end of cavity 38 in coupling device 22. The flatted surface portions 61 are provided to reduce the pressure required for press-fitting the portion 60 of ferrule 50 in cavity 38. Portion 60 merges with a slightly smaller diameter portion 63 of ferrule 50 which further reduces the pressure required to press-fit the ferrule 50 into the cavity 38.

The portion 63 of ferrule 50 abuts annular shoulder 40 in coupling device 22 and is joined integrally to a considerably smaller diameter portion 64 of ferrule 50. As shown in FIG. 3, the portion 64 also comprises alternate flatted and rounded surface portions, 65 and 66, respectively, which extend longitudinally of the ferrule 50. The rounded surface portions 66 are substantially concentric with the axial centerline of ferrule 50 and are press-fitted into the axial bore 36 in the central portion 32 of coupling device 22. Flatted surface portions 65 are provided to reduce the pressure required for press-fitting the portion 64 into the bore 36. The portion 64 merges with a terminal end portion 68 of ferrule 50 having a slightly smaller diameter which also reduces the pressure required for press-fitting the portion 64 of ferrule 50 in the axial bore 36.

As shown more clearly in FIG. 4, the outer diameter end portion 68 is substantially less than the outer diameter of the spacer cup 24 which is axially disposed in bore 36 for longitudinal slidable movement along the bore 36. End portion 68 of ferrule 50 has a terminal end surface 70 which is polished and abuts an annular surface 73 of cup 24 encircling a centrally disposed aperture 72 in the cup. The outer periphery of cup 24 slidably engages the inner wall surface of central portion 32 defining axial bore 36 and, as shown in FIG. 5, preferably has an axially extending rim 74 which provides a bearing surface for supporting the cup 24 during longitudinal slidable movement thereof. The aperture 72 in cup 24 is larger in diameter than a polished end surface 99 of the light conductor 28 which is centrally disposed in the polished end surface 70 of ferrule 50.

As shown in FIG. 6, the ferrule 50 is provided with an axial bore 76 which has an outwardly tapering end portion 77 in the neck-end portion 48 of the ferrule. End portion 77 of bore 76 leads to a portion 78 thereof which has a diameter slightly larger than the outer diameter of jacket 30 in cable 26. The portion 78 of bore 76 extends axially through portion 60 of ferrule 50 and into the portion 63 where it terminates in an inwardly tapering shoulder 79. The shoulder 79 merges with a further inwardly tapering portion 80 of bore 76 which extends axially through the portion 64 and into the terminal end portion 68 of ferrule 50. In terminal end portion 68 of ferrule 50, the inwardly tapering portion 80 of bore 76 communicates with a small diameter end portion 81 thereof which terminates at the polished end surface 70 of ferrule 50.

In assembling the connector 42, slip ring 52 is placed in encircling relationship with the neck-end portion 48 of ferrule 50 which is then inserted into the shell 44 until the neck-end portion 48 protrudes out of the aperture 46 and the skirt 56 snaps into the annular channel 58. An end portion of the outer jacket 30 of fiber optic cable 26 is stripped back to expose a predetermined length of light conductor 28. Then, a bonding material 82, such as epoxy cement, for example, is coated liberally on the exposed length of light conductor 28 as well as a length of outer jacket 30. This cement coated length of cable 26 is then inserted into the outwardly tapering portion 77 of bore 76 in the protruding neck-end portion 48 of ferrule 50. The coated length of cable 26 then is pressed axially into the bore 76 until the end surface of jacket 30 abuts the tapered shouldered portion 79 which communicates with inwardly tapering portion 80 of the bore. The stripped length of light conductor 28, still liberally coated with bonding material 82, is pressed axially through the portions 80 and 81 of the bore 76 to protrude from the end surface 70 of ferrule 50. The excess bonding material 82 fills the inwardly tapering portion 80 and the outwardly tapering portion 77 of bore 76. Also, the bonding material 82 fills any clearance spaces between the outer jacket 30 of cable 26 and the inner surfaces of ferrule 50 defining the respective portions of bore 76. The bonding material 82 then is allowed to set and bond the coated end portion of cable 26 to the ferrule 50 such that they form a unitary structure. This unitary structure is enabled to move laterally a slight amount within shell 44 by making the aperture 46 in the closed end of shell 44 slightly oversized, such as twenty thousandths, for example, with respect to the outer diameter of neck-end portion 48.

The assembled connector 42 having a length of light conductor 28 protruding from the end surface 70 of ferrule 50 then may be inserted, as shown in FIG. 8, into a polishing fixture 84. Polishing fixture 84, as shown in FIG. 7, comprises a disc 86 having a substantially flat surface 88 and an opposing surface from which extends a centrally disposed stud 90. Stud 90 has an axial bore 92 including a larger diameter end portion 94 terminating in a shoulder 95 which merges with an intermediate diameter portion 96 of the bore 92. The intermediate diameter portion 96 terminates in tapered shoulder 97 which merges with a small diameter end portion 98 of bore 92. Small diameter portion 98 of bore 92 terminates in a central portion of the flat surface 88. The ferrule 50 of connector 42 is inserted into the axial bore 92 of fixture 84 until the portion 63 of ferrule 50 is seated against the shoulder 95. As a result, the portion 64 of ferrule 50 is disposed in the portion 96 of bore 92; and the terminal end portion 68 of ferrule 50 protrudes slightly from the flat surface 88 of fixture 84. Also, the length of light conductor 28 protruding from the end surface 70 of ferrule 50 extends further outward from the flat surface 88 of fixture 84.

The stud 90 of fixture 84 is provided with external threads for engagement with the internally threaded shell 44 of connector 42 whereby the closed end of shell 44 presses axially on the slip ring 52 which presses axially on the annular shoulder 54 of ferrule 50. Thus, the ferrule 50 is pressed axially into bore 92 of stud 90, such that the rounded surface portions 62 of ferrule portion 60 are press-fitted into the portion 94 of bore 92 and the rounded surface portions 66 of ferrule portion 64 are press-fitted into the portion 96 of bore 92. After tightening the shell 44 of connector 42 on stud 90, the flat surface 88 of fixture 84 then is applied to a suitable polishing device for removing the protruding length of light conductor 28 and polishing the end surface 99 thereof, as well as the end surface 70 of ferrule 50. In this manner, the end surface 99 of light conductor 28 is made flush with the end surface 70 of ferrule 50, as shown in FIG. 9, and is provided with a suitably smooth finish for enhancing the transmission of light into and out of the conductor 28.

Referring again to FIGS. 1-4, it may be seen that the assembled and processed connector 42 is secured to the end portion 34 of coupling device 22 by inserting the terminal end portion 68 of ferrule 50 into the adjacent end portion of bore 36 and pressing axially until the internally threaded portion of shell 44 engages the external threads of end portion 34. Then, the knurled outer surface of central portion 32 of device 22 is held firmly while the shell 44 is rotated about the neck-end portion 48 of ferrule 50. As a result, the closed end of shell 42 presses axially on the slip ring 52 which permits the shell to rotate while transmitting the axial pressure therefrom to annular shoulder 54 of the stationary ferrule 50. Consequently, the rounded surface portions 66 of ferrule portion 64 are press-fitted snugly into the adjacent end portion of bore 36, and the rounded surface portions 62 of the ferrule portion 60 are press-fitted snugly into the cavity 38 of coupling device 22.

Due to the concentricity of the rounded surface portions 66 and 62, respectively, with the axial centerline of ferrule 50, as described, the light conductor 28 of cable 26 is disposed on the axial centerline of device 22. Lateral displacement of the ferrule 50 within shell 44, which may be required to dispose the light conductor 28 on the axial centerline of device 22, is permitted by the oversized aperture 46 in the closed end of shell 44 encircling the neck-end portion 48 of ferrule 50. The shell 44 is rotated relative to the coupling device 22 until the ferrule portion 63 seats against the annular shoulder 40 at the inner end of cavity 38. When it is necessary to disengage the connector 42 from the end portion 38 of device 22, the shell 44 is rotated in the opposite direction to bring a shoulder of annular channel 58 in shell 44 against the larger diameter end of skirt 56. Thus, continued rotation of the shell 44 in the same direction will withdraw the press-fitted ferrule portions 60 and 64 from cavity 38 and bore 36, respectively. In a similar manner, the other connector 42a is secured to or disengaged from the end portion 34a of device 22.

As shown in FIGS. 4 and 10, the reduced diameter of end portion 68 permits it to enter cup 24 and bring the polished end surface 70 of ferrule 50 into abutting relationship with the annular surface 73 of cup 24. Also, the polished end surfce 70a of ferrule 50a in connector 42a is brought into abutting relationship with the opposing surface 73a of cup 24 encircling central aperture 72 therein. As a result, the outer peripheries of terminal end portions 68 and 68a, respectively, cooperate with the encircling wall of central portion 32 to form an interposed annular channel 100 wherein the rim 74 of cup 24 is disposed for slidably engaging the inner wall surface of central portion 32 defining the bore 36.

By virtue of the rounded surface portions 62 and 66 of ferrule 50 pressingly engaging the inner wall surfaces of end portion 34 and central portion 32, respectively, the bore 76 in ferrule 50 and the light conductor 28 therein are disposed on the aligned axial centerlines of cavity 38 and bore 36. Similarly, the bore 76a in ferrule 59a and the light conductor 28a therein are disposed on the aligned axial centerlines of cavity 38a and bore 36a. Also, by virtue of the rim 74 of cup 24 slidably engaging the inner surface of central portion 32, the aperture 72 which is centrally disposed in the closed end of cup 24 is disposed on the axial centerline of bore 36. Thus, the aperture 72 in cup 24 is axially aligned with the polished end surfaces 99 and 99a centrally disposed in the polished end surfaces 70 and 70a of ferrules 50 and 50a, respectively. Accordingly, the cup 24 is provided with a suitable thickness for optically coupling the light conductor 28 of cable 26 to the light conductor 28a of cable 26a. Also, the aperture 72 is provided with a diametric size larger than the diametric sizes of light conductors 28 and 28a to avoid the possibility of damaging the respective polished end surfaces 99 and 99a, as by burring, for example.

As shown in FIG. 11A, the coupling assembly 20 may be formed by initially inserting the terminal end portion 68 of ferrule 50 through cavity 38 and into the bore 36 of coupling device 22. If the axially disposed cup 24 is located closer to cavity 38 than to cavity 38a, the polished end surface 70 of ferrule 50 will be brought into abutting relationship with the annular surface 73 of cup 24 before the portion 63 of ferrule 50 reaches the annular shoulder 40 in device 22. As a result, the cup 24 will slide longitudinally along the bore 36 until the portion 63 of ferrule 50 seats against the annular shoulder 40, as shown in FIG. 11B. During this longitudinal slidable movement, the rim 74 of cup 24 will provide a bearing surface for supporting the cup in axially disposed orientation within the bore 36. Consequently, when the terminal end portion 68a of ferrule 50a is inserted through cavity 38a and into opposing end of bore 36, the polished end surface 70a of ferrule 50a will be brought into abutting relationship with opposing annular surface 73a of cup 24. Accordingly, as shown in FIG. 11C, the cup 24 will be clamped firmly between the end surfaces 70 and 70a of ferrules 50 and 50a, respectively, before the portion 63a of ferrule 50a seats against the annular shoulder 40a in device 22. If desired, the connector 42 may be backed-off and the connector 42a advanced a suitable amount for centering the cup 24 between the respective shoulders 40 and 40a, such that neither the portion 63 nor the portion 63a is seated against the associated adjacent shoulder in device 22.

Alternatively, as shown in FIG. 12A, the terminal end portion of ferrule 50 may be initially inserted into the bore 36 when the cup 24 axially disposed in bore 36 is located closer to the cavity 38a than to the cavity 38. As a result, the portion 63 of ferrule 50 will seat against the annular shoulder 40 in coupling device 22 prior to the end surface 70 of ferrule 50 reaching the annular surface 73 of cup 28, as shown in FIG. 12B. However, when the terminal end portion 68a of ferrule 50a is subsequently inserted into the opposing end of bore 36, as shown in FIG. 12C, the end surface 70a of ferrule 50a will be brought into abutting relationship with the annular surface 73a of cup 24. Accordingly, the cup 24 will slide longitudinally along the bore 36 until its annular surface 73 is brought into abutting relationship with the end surface 70 of ferrule 50. Thus, the cup 24 will be clamped firmly between the end surfaces 70 and 70a of ferrules 50 and 50a, respectively, before the portion 63a of ferrule 50a comes into contact with the annular shoulder 40a in device 22. Again, ferrule 50 of connector 42 may be backed out of the bore 36 a sufficient distance and ferrule 50a of connector 42a advanced into the bore 36 a corresponding distance, such that the cup 24 remains firmly clamped between the end surfaces 70 and 70a, respectively, and is centered between the annular shoulders 40 and 40a, respectively.

Still other alternative situations that could occur involve the terminal end portion 68a of ferrule 50a being inserted into bore 36 prior to inserting the terminal end portion 68 of ferrule 50. In that instance, the cup 24 could be initially located too close to the cavity 38a, which constitutes a mirror image of the situation illustrated in FIGS. 11A–11C; or the cup 24 could be initially located closer to the cavity 38 than to the cavity 38a, which constitutes a mirror image of the situation illustrated in FIGS. 12A–12C. In any of these situations, however, the cup 24 is enabled to remain axially disposed in bore 36 while sliding longitudinally along the bore 36 for bringing its opposing annular surfaces 73 and 73a into interfacing relationship with respective polished end surfaces 70 and 70a of the ferrules 50 and 50a, respectively. As a result, the thickness of cup 24 is clamped firmly between the polished end surfaces 70 and 70a; and the aperture 72 in cup 24 is axially aligned with the polished end surfaces 99 and 99a of light conductors 28 and 28a, respectively. Thus, the cup 24 constitutes a slidable coupling means for spacing the respective polished end surfaces 99 and 99a of light conductors 28 and 28a apart sufficiently to provide optical coupling therebetween while avoiding damage to these polished end surfaces.

Figure 13:
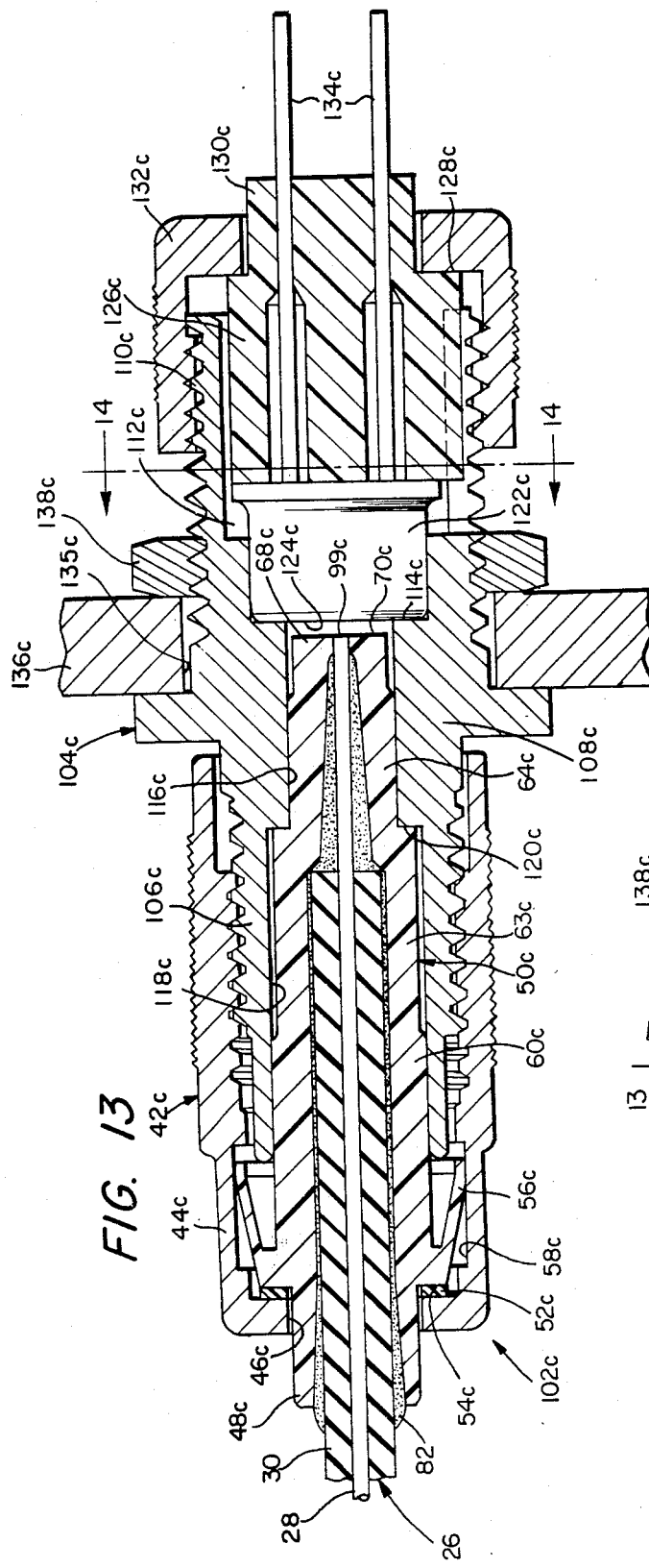
FIG. 13 is an axial sectional view of a cable terminal coupling device coupling one of the cables shown in FIG. 1 to a light operative device.
Figure 14:
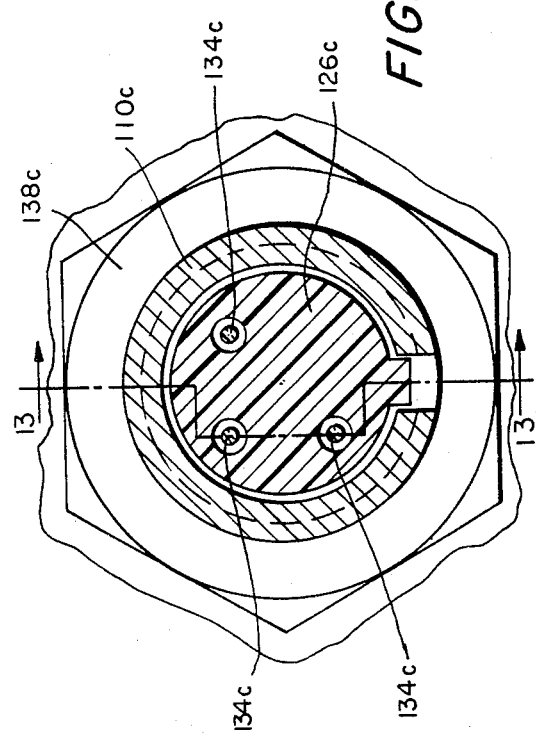
FIG. 14 is a transverse sectional view taken along the line 14—14 in FIG. 13 and looking in the direction of the arrows.

As shown in FIGS. 13 and 14, the opposing end portion of cable 26 may be provided with a connector 42c which is identical in construction and configuration to the connector 42. Accordingly, component parts of the connector 42c are identified by the numerals designating equivalent component parts of the connector 42 but followed by the letter "c". Connector 42c may be embodied in a terminal coupling assembly 102c comprising a tubular coupling device 104c having an externally threaded end portion 106c integrally joined to one end of a flanged central portion 108c. Central portion 108c has an opposing end integrally joined to an externally threaded end portion 110c which has a larger outer diameter than the end portion 106c.

Axially disposed in the end portion 110c is a stepped cavity 112c having an outer end portion terminating in an open end of the tubular coupling device 104c. Cavity 112c has an inner end terminating in an annular shoulder 114c formed at the adjacent end of central portion 108c. The inner end portion of cavity 112c communicates with a bore 116c axially disposed in the central portion 108c and defined by a substantially concentric inner surface thereof. Bore 116c has an opposing end communicating with a relatively larger diameter cavity 118c, which is axially disposed in the end portion 106c and has an inner end portion terminating at an annular shoulder 120c formed at the adjacent end of the resulting thicker wall central portion 108c. The cavity 118c has an outer periphery defined by a substantially concentric, inner wall surface of the end portion 106c, has an outer end portion terminating in the other open end of tubular device 104c.

The external threads of end portion 106c are engaged by the internally threaded shell 44c of connector 42c which has the terminal end portion 68c of ferrule 50c inserted into the adjacent end portion of bore 116c. As a result, surface portions of the ferrule portions 60c and 64c are brought into pressure engagement with the substantially concentric, inner wall surfaces of end portion 106c and central portion 108c, respectively. Consequently, the ferrule portion 63c advances into cavity 118c until it seats against annular shoulder 120c at the inner end thereof. Also, the terminal end portion 68c advances into bore 116c until the polished end surface 70c of ferrule 50c comes to rest at a predetermined distance, such as ten thousandths, for example, from the annular shoulder 114c.

The externally threaded end portion 110c of coupling device 104c may be passed through an aperture 135c in a support panel 136c and engaged by a nut 138c, which is threaded on end portion 110c until the panel 136c is pressed firmly between the flange of central portion 108c and the nut 138c to mount the coupling device 104c securely on the panel 136c. A conventional light operating device 122c is inserted into the stepped cavity 112c and seated against the annular shoulder 114c such that an effective or working surface 124c of the device 122c is disposed in axially spaced relationship with the polished end surface 70c of ferrule 50c. As a result, the polished end surface 99c of light conductor 28 centrally disposed in the end surface 70c of ferrule 50c is optically coupled to the effective or working surface 124c of the light operating device 122c. The light operating device 122c may be supported on one end surface of a moldable plastic block 126c which terminates at its other end portion in an anular shoulder 128c and reduced diameter neck-end portion 130c. Encircling the neck-end portion 130c and bearing against annular shoulder 128c is a closed end of a cup-shaped nut 132c which has an axially extending wall provided with internal threads for engaging the externally threaded end portion 110c of device 104c. Protruding axially from the neck-end portion 130c is a plurality of conductors 134c which extend through the block 126c and are connected to respective electrodes (not shown) in the light operating device 122c. Each of the conductors 134c may be connected to respective electrical conductors to connect the associated electrodes of light operating device 122c to respective electrical source means for operating the device 122c.

Figure 15:
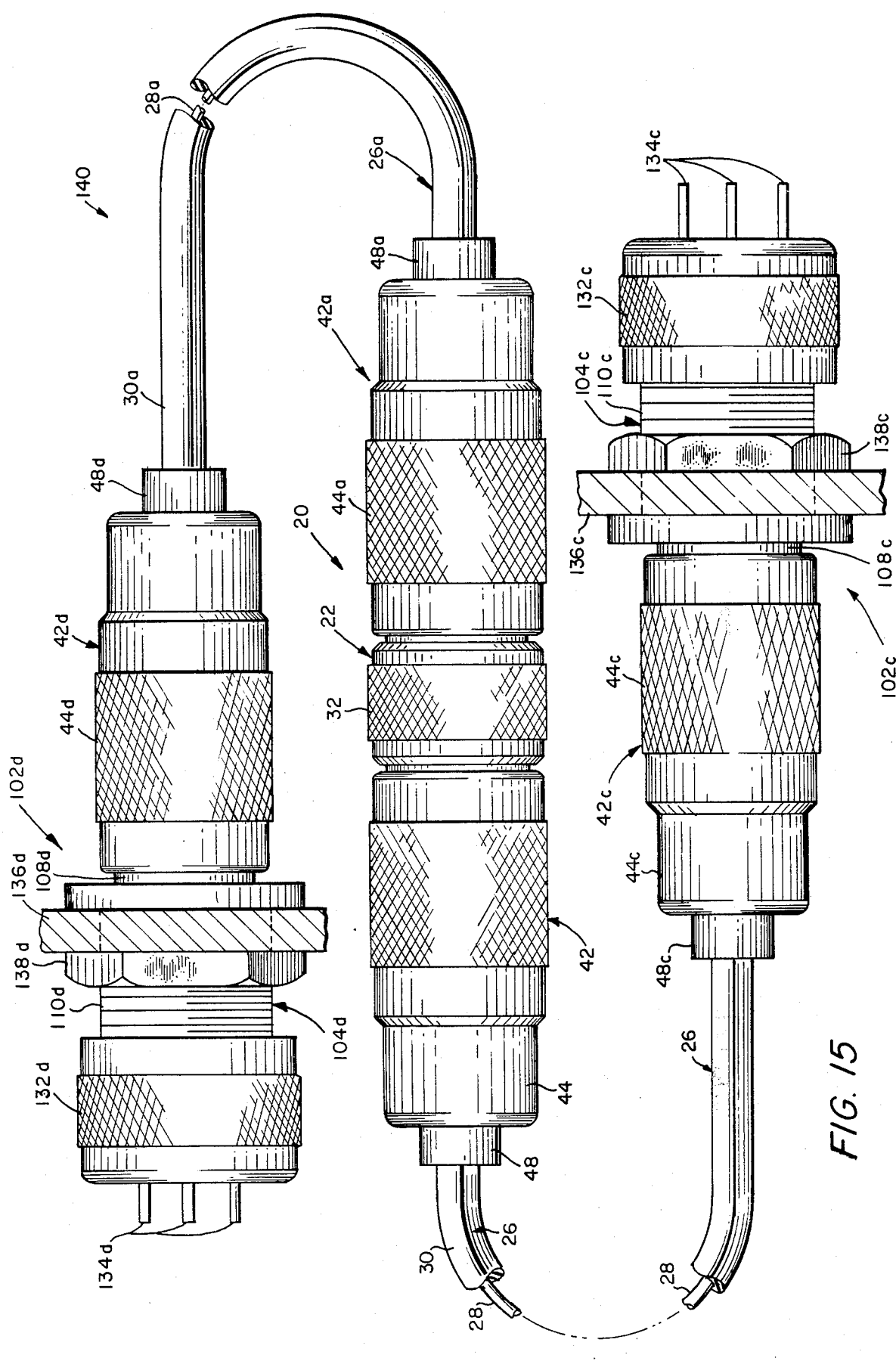
FIG. 15 is a schematic view of a fiber optic cable assembly embodying the fiber optic coupling assemblies shown in FIGS. 1 and 13.

Thus, as shown in FIG. 15, a fiber optic cable assembly 140 may comprise the fiber optic cable 26 having an input end portion connected to the terminal coupling assembly 102c mounted on support panel 136c. The coupling assembly 102c comprises the fiber optic connector 42c connected through coupling device 104c to a light operating device 122c, such as a conventional light emitting diode, for example, whereby light emitted from the diode enters the polished end 99c of light conductor 28 for transmission longitudinally through the fiber optic cable 26. As a result, light is emitted from the opposing end 99 of light conductor 28 which is attached through a connector 42 to the coupling device 22 of cable-to-cable coupling assembly 20. In coupling assembly 20, the light conductor end surface 99 is optically coupled through the aperture 72 in spacer cup 24 to the end surface 99a of light conductor 28a in fiber optic cable 26a. Consequently, light radiating from the surface 99 of light conductor 28 passes through the aperture 72 in cup 24 and enters the end surface 99a of light conductor 28a with minimal energy losses. The light then is transmitted longitudinally through the light conductor 28a of cable 26a to the opposing output end 99d of conductor 28a which is connected through a connector 42d to another terminal coupling assembly 102d mounted on a support panel 136d. Coupling assembly 102d is similar to the assembly 102c shown in FIGS. 13 and 14, but the light operating device in assembly 102d comprises a conventional light sensitive device 122d, such as a photodiode, for example. Accordingly, the light produced by device 122c in coupling assembly 102c is transmitted through light conductors 28 and 28a by means of coupling assembly 20 to radiate from end surface 99d of light conductor 28a in coupling assembly 102d and cause the light sensitive device 122d to produce a corresponding electrical output signal.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted in an illustrative rather than in a restrictive sense.

What is claimed is:

1. A fiber optic coupling device comprising:
   a body having a bore therein with opposite ends of said bore adapted to receive opposing ends of respective fiber optic cables; and
   a spacer slidably disposed within said bore and self-supported therein by having a side wall portion of the spacer engaged with wall portions of said bore, said spacer having a predetermined thickness wall portion disposable between said opposing ends of the fiber optic cables within the body and being slidable along said bore upon engagement of said predetermined thickness wall portion with either one of said opposing ends of the respective fiber optic cables.

2. A fiber optic coupling device as set forth in claim 1 wherein said spacer is adapted for sliding along said bore to a position where the thickness of said predetermined thickness wall portion is disposed for spacing said opposing ends of the respective fiber optic cables a predetermined distance apart.

3. A fiber optic coupling device as set forth in claim 2 wherein said thickness of the predetermined thickness wall portion is on the order of about one thousandths of an inch.

4. A fiber optic coupling device as set forth in claim 1 wherein said side wall portion has an outer peripheral surface slidably engaging an inner surface of said wall portions of the bore.

5. A fiber optic coupling device as set forth in claim 4 wherein said predetermined thickness wall portion includes an aperture disposed for optically coupling said opposing ends of the respective fiber optic cables to one another.

6. A fiber optic coupling device as set forth in claim 5 wherein said outer peripheral surface of said side wall portion slidably engaging said inner surface of said wall portion of the bore supports said predetermined thickness wall portion transversely of the bore for abutting relationship with said opposing ends of the respective fiber optic cables.

7. A fiber optic coupling device as set forth in claim 1 wherein said spacer is cup-shaped and has a rim-like side wall means slidably engaging an inner surface of said wall portion of the bore for providing a bearing surface to support the spacer during said slidable movement.

8. A fiber optic coupling assembly comprising:

a coupling device having a tubular body;

a spacer self-supported within said body, said spacer having an axially extending wall means slidably engaging the inner surface of said tubular body and having sufficient axial length for providing a bearing surface and supporting said spacer during slidable movement along said tubular body, said spacer also having transversely extending wall means provided with an aperture and with a thickness in the axial direction less than said axial length of the axially extending wall means for providing optimal light transmission through said aperture; and a fiber optic connector having an end portion protruding into an end of said tubular body and adapted to engage said spacer and slide said spacer along said tubular body.

9. A fiber optic coupling assembly as set forth in claim 8 wherein:

said end portion of the connector includes a length having an outer surface with first axially extended portions dimensioned for frictional contacting relationship with inner wall portions of said tubular body and second axially extended portions dimensioned for radially spaced relationship with other inner wall portions of the tubular body, said first and second axially extended portions being alternately disposed about said length of said end portion of the connector.

10. A fiber optic coupling assembly as set forth in claim 8 wherein said fiber optic connector includes:

a shell having an inner surface provided with a recessed portion;

a body in the shell having a bore and having a flexible portion snappingly engaged into said recessed portion; and a fiber optic cable having an end portion fixedly secured in said bore.

11. A fiber optic polishing fixture comprising:

a housing portion having means for coupling to a fiber optic connector secured to a fiber optic cable, said cable having an end portion protruding from said connector and said housing portion; and a plate portion affixed to said housing portion and having a substantially flat outer surface provided with an aperture through which said fiber optic cable protrudes.

* * * * *